Patented Sept. 16, 1952

2,610,931

UNITED STATES PATENT OFFICE 2,610,931

SLURRY ADSORPTION SEPARATION AND FRACTIONATION OF SUGARS

Edna M. Montgomery, Peoria, Howard F. Conway, Creve Coeur, and Francis B. Weakley, Peoria, Ill., assignors to the United States of America as represented by the Secretary of Agriculture No Drawing. Application July 6, 1950, Serial No. 172,378

10 Claims. (Cl. 127—55)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

In application Serial No. 107,623, filed July 29, 1949, now Patent Number 2,549,840, by Montgomery and Weakley, a process is described for the fractionation and isolation of sugars contained in sugar solutions and to the subsequent recovery of pure sugars therefrom. In that specification a process is described for selective adsorption and desorption of the various sugar constituents of a sugar solution using active carbon as the adsorbent. This invention relates to an improved method whereby the process of adsorption and desorption may be carried out more conveniently and more economically than heretofore possible.

Aqueous solutions of certain sugars, such as glucose, occur industrially in the hydrolysis of amylaceous or cellulosic materials. For example, large quantities of glucose solutions are prepared by the hydrolysis of starch in the manufacture of corn sirup, corn sugar, and dextrose. These solutions contain minor but significant amounts of other sugars not removed by conventional refining procedure. For example, the disaccharide isomaltose, 6-[α-d-glucopyranosyl]-d-glucose, also called brachiose, occurs in the crude glucose solutions obtained by the hydrolysis of starch materials. This disaccharide is extremely difficult to isolate, having been only recently prepared in pure crystalline form. In addition to sugars, such as disaccharides, other material, such as oligosaccharides and dextrins, occur in crude glucose solutions. In the specification referred to above the constituent sugars of such solutions are separated by preferential adsorption and desorption and subsequently recovered as pure solutions or ultimately in pure crystalline form. According to the process of the prior specification the sugar solution is contacted with a mass comprising active carbon as an adsorbent and the prior invention includes adsorption and displacement procedures employing aqueous solutions of phenol, acetic acid or ephedrine as the displacing or desorbent agent.

Neither the prior invention nor this invention should be confused with the conventional clarification of sugar solutions by carbons. During the conventional clarification processes the carbon tends to adsorb impurities and only incidentally including small amounts of sugars present in the original sugar solution. However, no one to our knowledge has ever successfully employed active carbon, or other adsorbent material, as a practical means for separating and/or isolating sugars by selective adsorption and displacement. In the prior conventional clarification and decolorizing processes, the treated solutions still contain the sugars, such as brachiose in solution, since the amount of decolorizing material used is critically insufficient to effect removal by adsorption.

The present invention is based upon the discovery that the sugar solution may be admixed with active carbon in a slurry process, and provided the proper proportions are employed in carrying out the process, all sugars other than glucose existing in the original solution together with the phenol are removed therefrom by being adsorbed upon the carbon. The remaining solution of glucose is thus purified of all such sugars. This purified glucose solution can be separated from the carbon by known methods, such as filtration, and subsequently concentrated and crystallized to obtain an exceedingly pure glucose sugar.

The separated carbon which bears adsorbed sugars may then be selectively desorbed to recover pure solutions of sugars. A series of pure solutions may be obtained by taking advantage of the differences in adsorbability between the sugars. As pointed out in the prior specification, displacing solutions such as dilute aqueous phenol will produce a successive displacement of the sugars. If the adsorbed sugars are of different molecular weights, the displacement solution contains a pure sugar until all of that type has been displaced. If that solution is removed and fresh displacement solution of higher concentration added, another sugar will be displaced. Thus by a series of selective displacements the adsorbed sugars and also the dextrins may be separated into individual fractions.

After all valuable constituents have been displaced from the carbon, it can be regenerated by washing with ethanol or methanol, and can be reused for adsorbing another batch of crude sugar solution.

The active carbon employed in our process is preferably a carbon of relatively high surface area and relatively free from extraneous materials. The vegetable carbons such as coconut shell carbon, Darco G60, Norite, Suchar, Columbia and the like are preferred because of their high surface area compared with the animal carbons. In general, the terms "active carbon" and "activated carbon" as used in this specification and claims are synonymous and refer to a carbon prepared such as by destructive distillation of carbonaceous materials. Their adsorbent properties are partially due to high temperature treatment during manufacture.

In general, the concentration of the sugar solution may vary from 0.5 percent up to 30 percent or more total sugars, the upper limit of concentration is dictated by the handling difficulties encountered with the viscous sugar solution. Practically, the lower limit of total sugars should be at least 10 percent, but it is to be understood, nevertheless, that adsorption and separation is possible with the more dilute solutions according to this invention.

The term "adsorbable sugars" will be used hereinafter to designate those sugars other than glucose which are adsorbed by the active carbon and are not displaceable by water. The ratio of active carbon to adsorbable sugars should preferably be about 20:1 on a weight basis. However, greater or less ratios may be employed depending upon the adsorption characteristics of the particular active carbon used, for example, the ratio may range from 15:1 to 30:1. The amount of carbon required can readily be determined by the disappearance of adsorbable sugars from the solution. A simple and convenient method for determining this point is by observing when the reducing power and polarimetric measurements indicate no adsorbable sugars in the aqueous phase.

In general, our invention is carried out by preparing a solution of at least 10 percent total sugars, as for example, glucose and adsorbable sugars, in a vat or other suitable container provided with means for vigorous stirring. If the content of adsorbable sugars is known, the calculated quantity of activated carbon may be added, preferably stepwise, and the slurry stirred vigorously to insure adequate contact. If the content of adsorbable sugars is unknown, the activated carbon may be added gradually and the supernatant sugar solution examined at intervals. As the chemical or optical properties of the solution indicate the absence of adsorbable sugars, the addition of carbon is stopped. For solutions containing glucose as the non-adsorbable component these values approach the theoretical values for glucose at the end point for carbon addition.

Selective removal of all adsorbable sugars may be carried out, stepwise, by the use of a convenient fraction of the required amount of carbon, regeneration and reuse of the carbon in the partially depleted solution.

We have moreover discovered that a small amount of displacing agent, such as phenol, added to the solution of adsorbable sugars prior to or during the adsorption step improves considerably the process of our invention. This treatment neutralizes the highly adsorbent points or areas of the carbon particles which otherwise interfere slightly with the adsorption and displacement steps by reason of minute local areas of intense adsorption. The treatment hence promotes smooth action of the carbon. The amount of displacing agent, such as phenol, used is limited to not more than one-tenth the total adsorptive capacity of the carbon with respect to a 0.3 percent aqueous solution of the agent. The amount of agent we employ in this treatment does not affect substantially the adsorptive capacity of the carbon for the adsorbable sugars.

*Example 1*

A solution containing 83 grams of glucose and minor, but appreciable amounts of adsorbable sugars, produced by enzymic hydrolysis of 100 grams of dry starch was deproteinized at pH 5.5 by the addition of basic lead acetate and then filtered. The value of $[\alpha]_D^{25°}$ was calculated to be $+76°$. The solution was slurried with active carbon at 25° C. and at pH 6.0. A total of 425 grams of carbon was added by first adding half, stirring for one-half hour and then adding the remaining half. After addition of the final amount, the calculated $[\alpha]_D^{25°}$ value was reduced to $+54.0°$ estimated as glucose. The carbon was separated by filtration and washed twice with water. The washed cake was slurried with 3200 ml. of 4 percent aqueous phenol and stirred for 20 minutes. The slurry was then filtered and the filtrate had an $[\alpha]_D^{25°}$ value of $+102.3°$, calculated as maltose hydrate.

Carbon-celite column fractionation of the filtrate resulted in the separation of 0.9 gram of dextrose and 8.0 grams of 6-[α-d-glucopyranosyl]-d-glucose, identified as the known crystalline octaacetyl - 6 - [α-d-glucopyranosyl]-β-d-glucose, $[\alpha]_D^{25°}$ $+98°$ (c, 1 in chloroform); yield, 13.5 grams.

*Example 2*

The deproteinized hydrolysate from 100 grams dry starch, obtained as in Example 1, was treated with 6 grams of phenol, the resulting solution possessing a phenol concentration of 0.3 percent. This solution was slurried with 425 grams of active carbon. At the end of three hours, polarimetric measurements indicated the absence of adsorbable sugars in solution. The carbon was separated by filtration and washed thoroughly with water. A total of 101.9 grams of α-dextrose monohydrate were recovered by crystallization from the filtrate and washings.

The washed carbon was slurried with 2 liters of water and 40 grams phenol was added portionwise. The carbon was separated by filtration, and the carbon washed with 1 liter of 0.3 percent aqueous phenol. The filtrate and washings were combined and the solution (3000 ml.) had a °S reading of $+2.8°$, Rcu (maltose hydrate) $=2.09$ mg./ml. The sugar was identified as in Example 1 as 6-[α-d-glucopyranosyl]-d-glucose; yield 6.5 grams (as disaccharide). The dextrin fraction was removed by washing with 4 percent phenol followed by methanol. A yield of alcohol precipitated, dry dextrin of 7.2 grams was obtained, $[\alpha]_D^{25°}+172°$ ($c_{12}$), Rcu (maltose hydrate) 59 percent.

*Example 3*

Procedure similar to that of Example 1 was followed on a pilot plant scale employing the solution obtained by the enzymic hydrolysis of 60 pounds of waxy corn starch as used in Example 1. The solution (150 gallons) was slurried with 60 pounds of activated carbon. This was equivalent to one-half the total calculated amount of carbon required according to our process. The carbon was press filtered and washed twice with water. The carbon was then slurried with 30 gallons of aqueous 4 percent phenol solution, stirred vigorously and press filtered. The filtrate contained 675 grams of 6-[α-d-glucopyranosyl]-d-glucose, identified as in Example 1.

The adsorbent taken from the filter press following recovery of the adsorbable disaccharide was dispersed in absolute methanol and press filtered. The adsorbent was then dispersed in water, press filtered, and again washed with water until alcohol free. The regenerated material was ready for use.

The regenerated adsorbent was added to the partially depleted hydrolysate and stirred by mechanical agitation for approximately two and one-half hours. The procedure for recovery of the adsorbable disaccharide was repeated. Approximately 235 grams of a 6-[α-d-glucopyranosyl]-d-glucose was obtained.

We claim:

1. The process which comprises contacting an aqueous starch hydrolyzate solution containing at least 10 percent glucose and polysaccharides with an amount of active carbon at a pH of about 6.0, said amount of carbon being sufficient to adsorb said polysaccharides, maintaining said contact in the form of a slurry for a period of time sufficient to accomplish substantially complete adsorption of said polysaccharides, as indicated by the approach of the optical and chemical properties of the solution to the theoretical values for pure glucose, the ratio of activated carbon to polysaccharides being in the range of 15:1 to 30:1, no more than enough carbon being added to obtain the solution of said theoretical values, separating the carbon from the aqueous phase, water-washing the carbon free of glucose and recovering adsorbed sugar by displacement from said carbon by means of an aqueous solution of phenol.

2. The process of claim 1 in which the adsorbed sugar is recovered as fractions by successive displacement from the carbon by means of 0.2 to 0.5 percent aqueous phenol.

3. The process of claim 1 in which the ratio of activated carbon to adsorbable sugar is about 20:1 on a weight basis.

4. The process of claim 1 in which glucose is recovered in highly purified state by crystallization from the aqueous phase of the adsorption step.

5. The process of claim 1 in which the solution of glucose and adsorbable sugar is treated with phenol corresponding to one-tenth the total adsorptive capacity of the carbon with respect to 0.3 percent aqueous phenol solution.

6. The process of claim 5 in which the amount of phenol is 0.3 percent by weight of the said solution.

7. In a process for recovering the compound 6-[α-d-glucopyranosyl]-d-glucose from aqueous mixture with glucose obtained by hydrolysis of starch materials, the improvement comprising slurrying the mixture with no more than sufficient finely divided active carbon to adsorb the said compound and sugars other than glucose, the addition of carbon being stopped when optical properties of the mixture approach those for glucose, phenol being present during the adsorption as displacing agent for said compound, the adsorption being at a pH of about 6.0 and at ordinary room temperature, thereafter separating the carbon, slurrying it with dilute aqueous phenol, and recovering said compound from the aqueous phenol.

8. A process which comprises contacting aqueous starch hydrolyzate, containing glucose and polysaccharides, with a slurry of finely divided active carbon in the weight ratio of 15:1 to 30:1 of carbon to polysaccharides, with agitation, the adsorption being at about 25° C. and at a pH of about 6 in the presence of phenol, the amount of phenol being not more than one-tenth the total adsorptive capacity of the carbon with respect to a 0.3 percent aqueous solution of the phenol, the total amount of carbon added being that at which the properties of the solution approach those of pure glucose, and removing the carbon with the polysaccharides adsorbed thereon.

9. A process which comprises contacting aqueous starch hydrolyzate, containing glucose and polysaccharides, with a slurry of finely divided active carbon in the weight ratio of 15:1 to 30:1 of carbon to polysaccharides, with agitation, the adsorption being at about 25° C. and at a pH of about 6, the total amount of carbon added being that at which the properties of the solution approach those of pure glucose, removing the carbon with the polysaccharides adsorbed thereon, and subsequently displacing the polysaccharides from the carbon with aqueous phenol.

10. The process of claim 8 in which the adsorbed polysaccharides are recovered by elution from the carbon with 0.2 to 10 percent aqueous solution of one of the group consisting of phenol, acetic acid, and ephedrine.

EDNA M. MONTGOMERY.
HOWARD F. CONWAY.
FRANCIS B. WEAKLEY.

REFERENCES CITED

The following references are of record in the file of this patent:

UNITED STATES PATENTS

| Number | Name | Date |
|---|---|---|
| 1,176,999 | Wijnberg | Mar. 28, 1916 |
| 1,533,030 | Sauer | Apr. 7, 1925 |
| 2,388,222 | Behrman | Oct. 30, 1945 |
| 2,549,840 | Montgomery | Apr. 24, 1951 |

OTHER REFERENCES

The Ind. Chemist, January 1942, pages 17 and 18, "Activated Carbon."

Jour. Amer. Chem. Soc. (Brinkleg et al.), volume 67 (1945), pages 1789 to 1793.

The Int. Sugar Jour., November 1947, page 248.

Nature, September 18, 1948, volume 162, page 448.